M. FEYBUSCH.
MACHINE FOR COVERING BOXES.
APPLICATION FILED MAY 29, 1918.

1,279,312.

Patented Sept. 17, 1918.
16 SHEETS—SHEET 1.

Inventor
Martin Feybusch
By his Attorney
van for Briesen

M. FEYBUSCH.
MACHINE FOR COVERING BOXES.
APPLICATION FILED MAY 29, 1918.

1,279,312.

Patented Sept. 17, 1918.
16 SHEETS—SHEET 2.

Inventor
Martin Feybusch
By his Attorney

M. FEYBUSCH.
MACHINE FOR COVERING BOXES.
APPLICATION FILED MAY 29, 1918.

1,279,312.

Patented Sept. 17, 1918.
16 SHEETS—SHEET 3.

Inventor
Martin Feybusch
By his Attorney

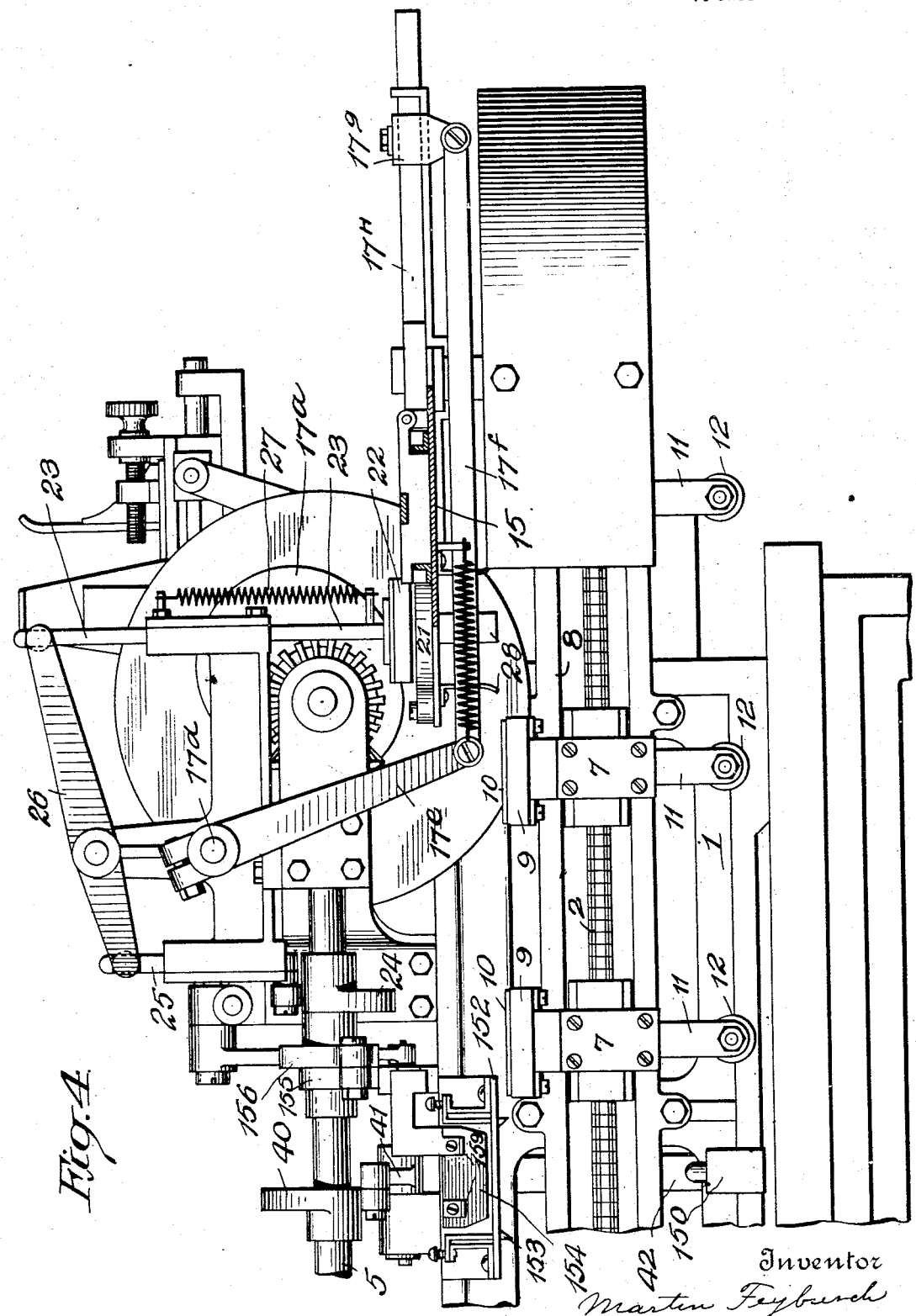

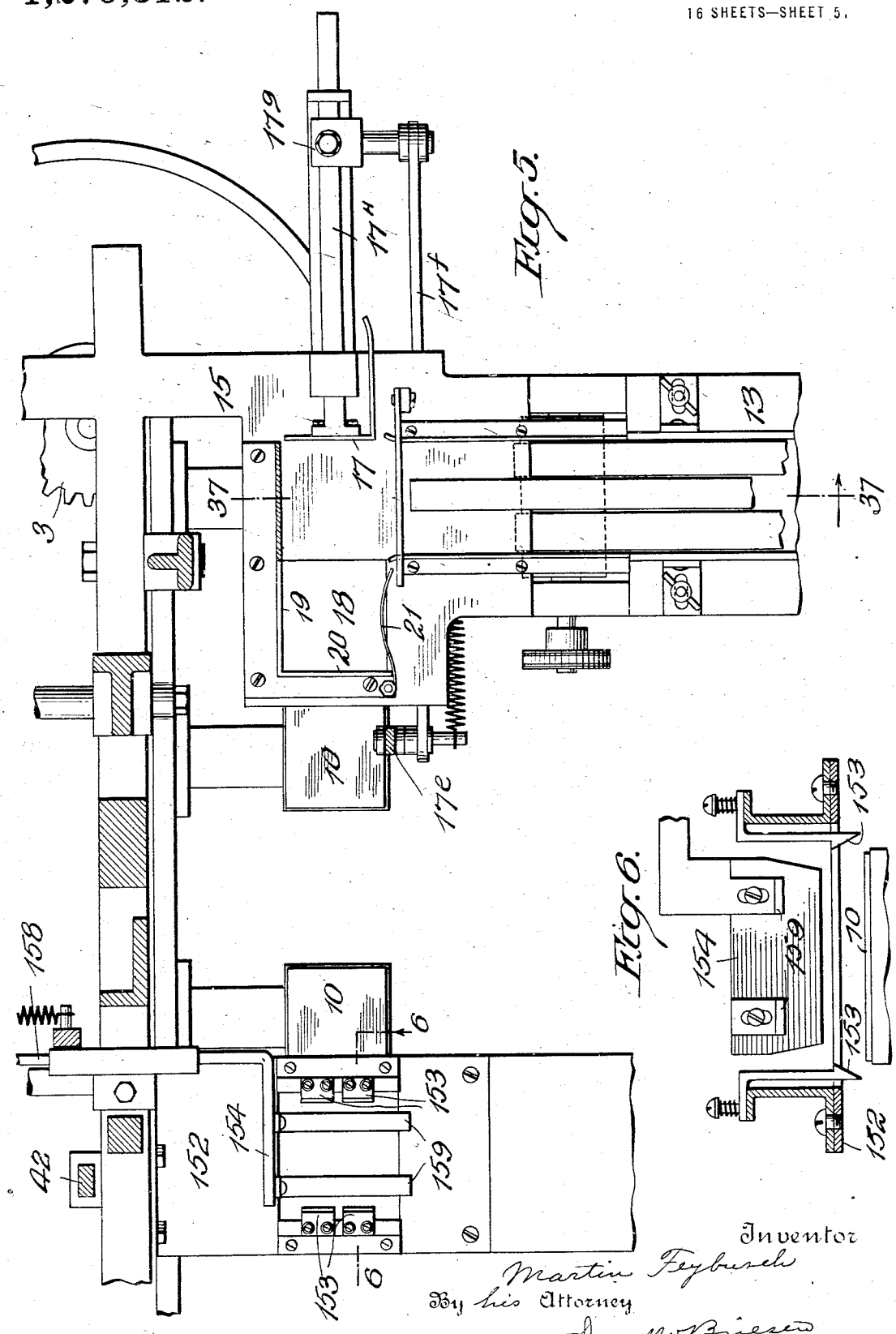

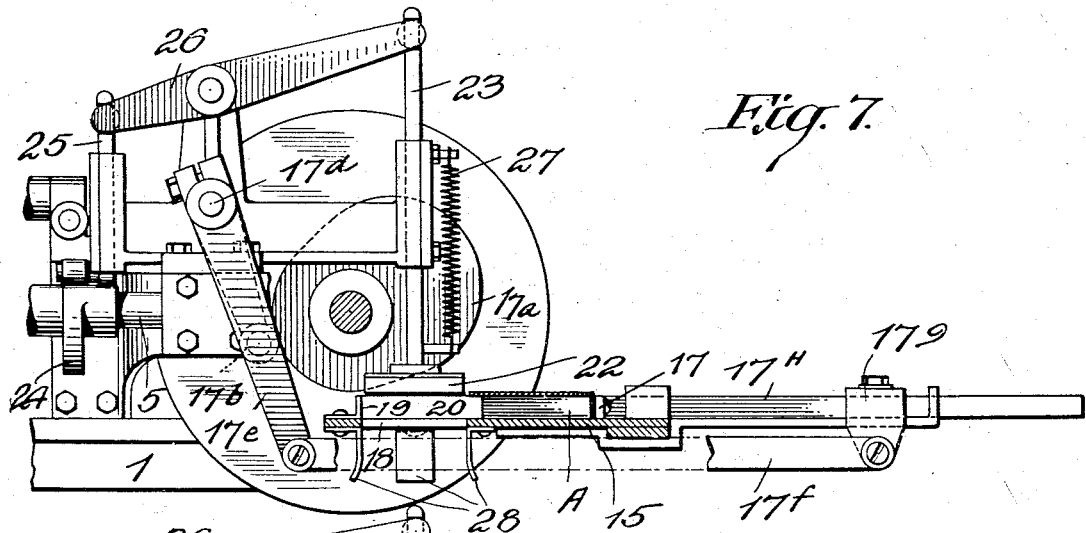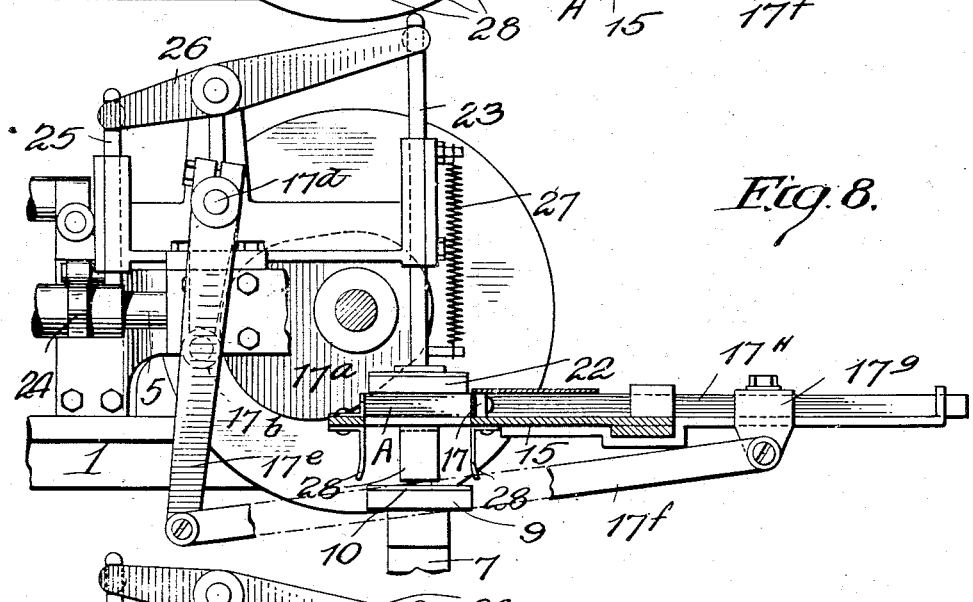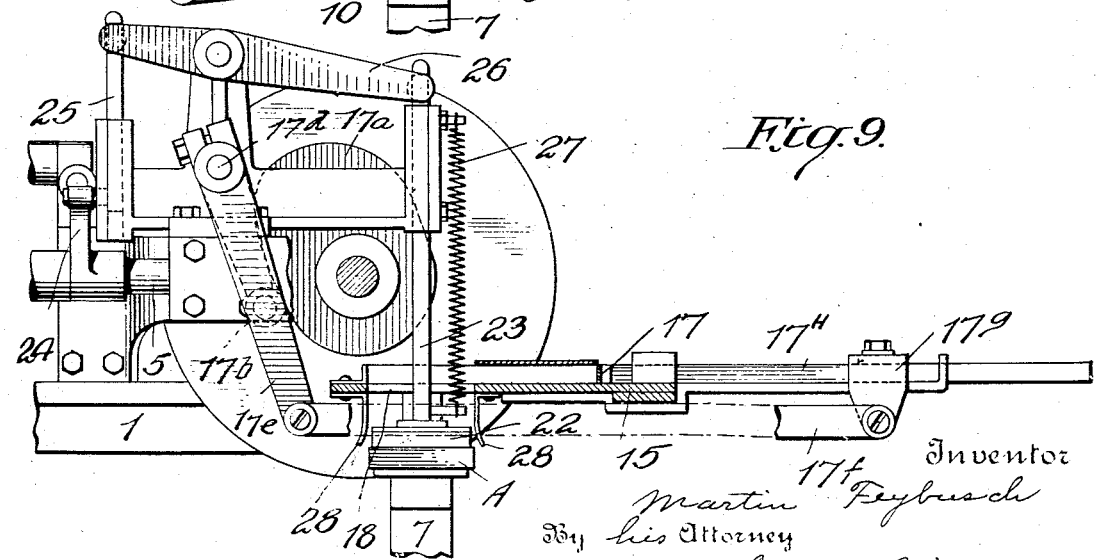

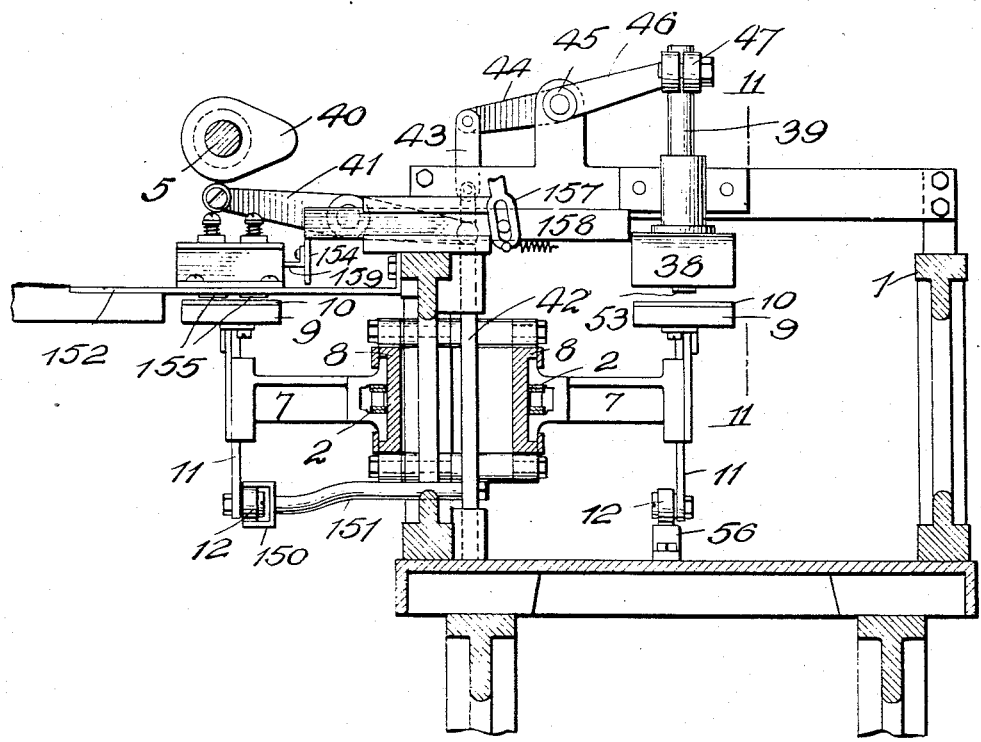

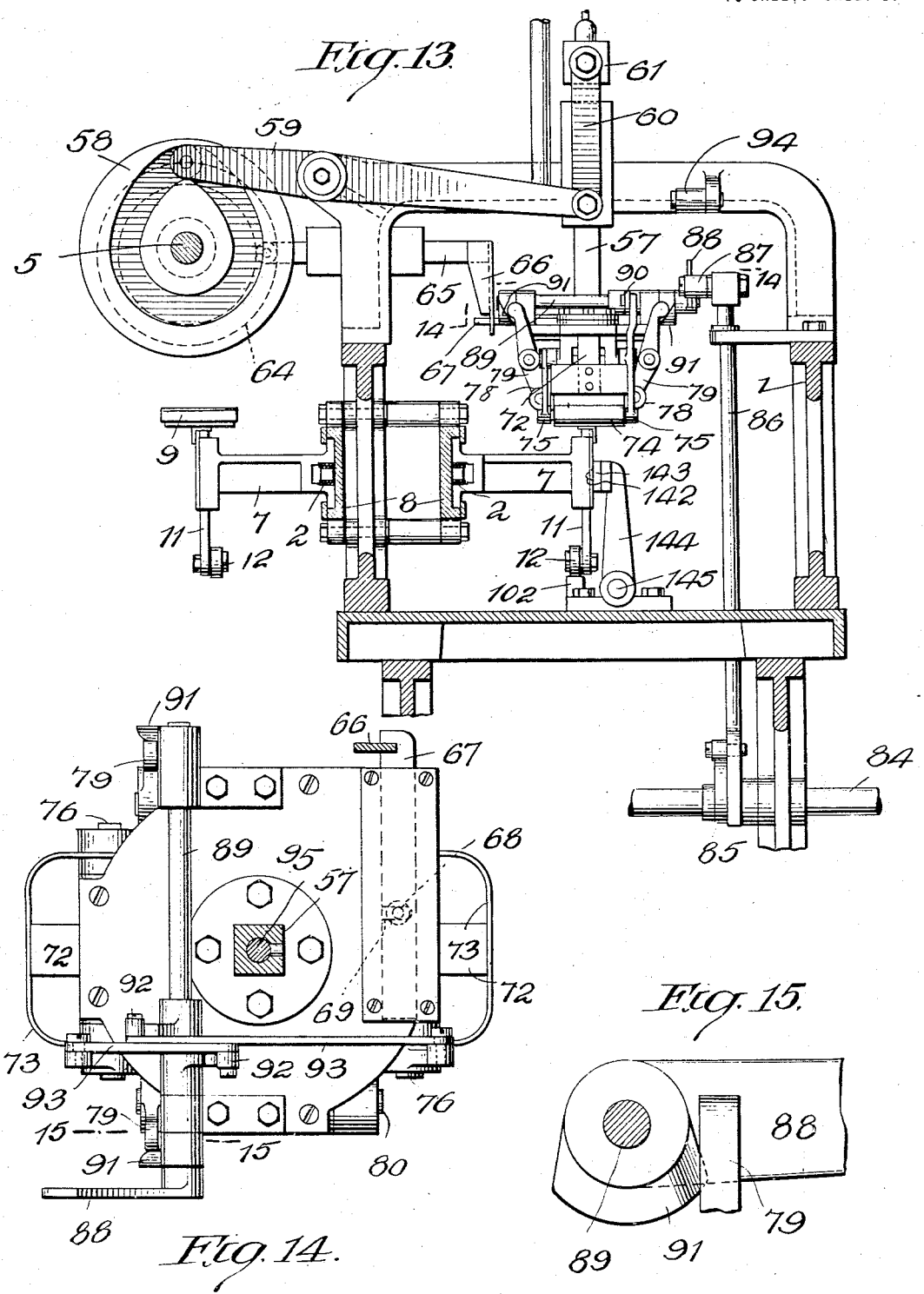

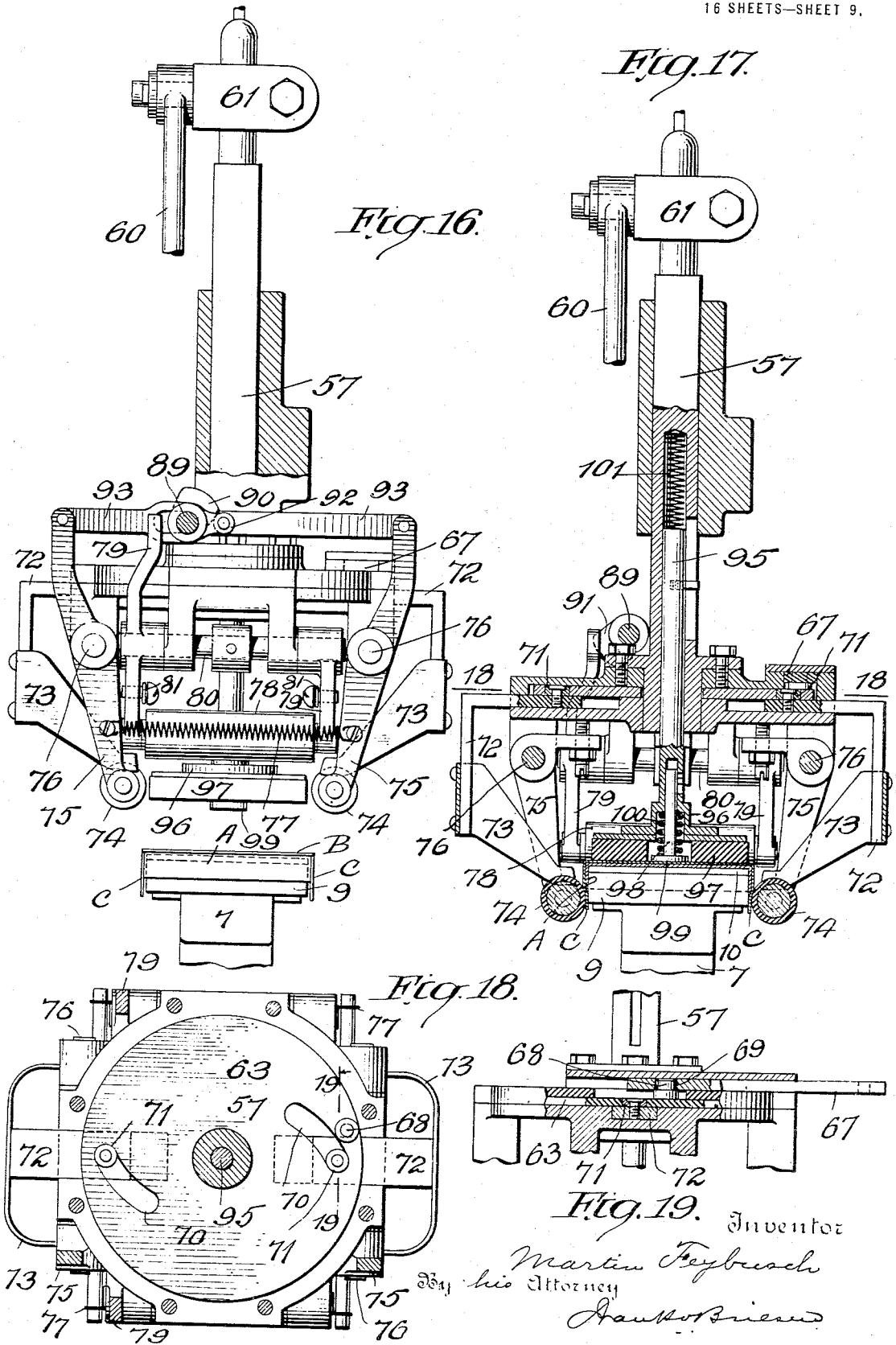

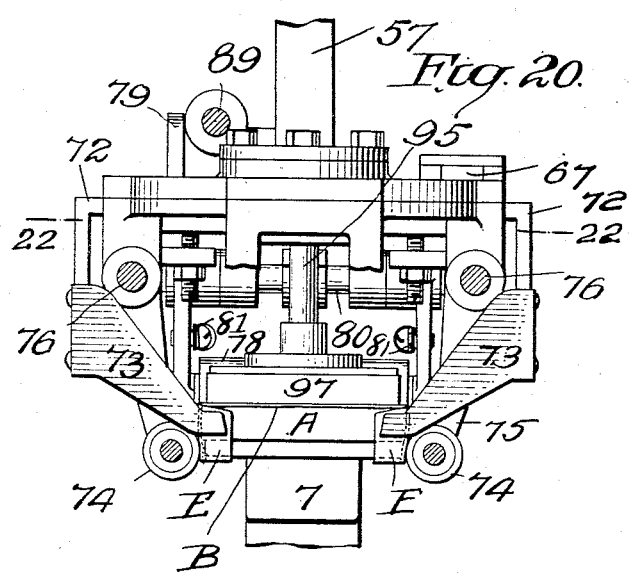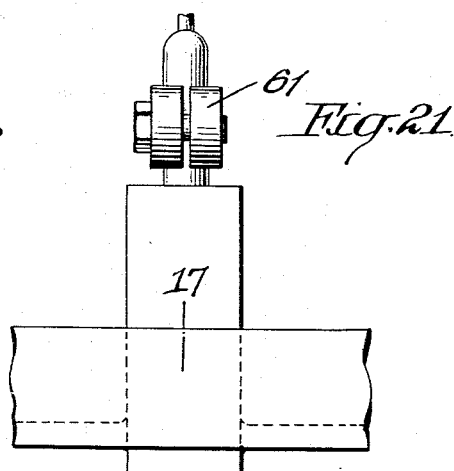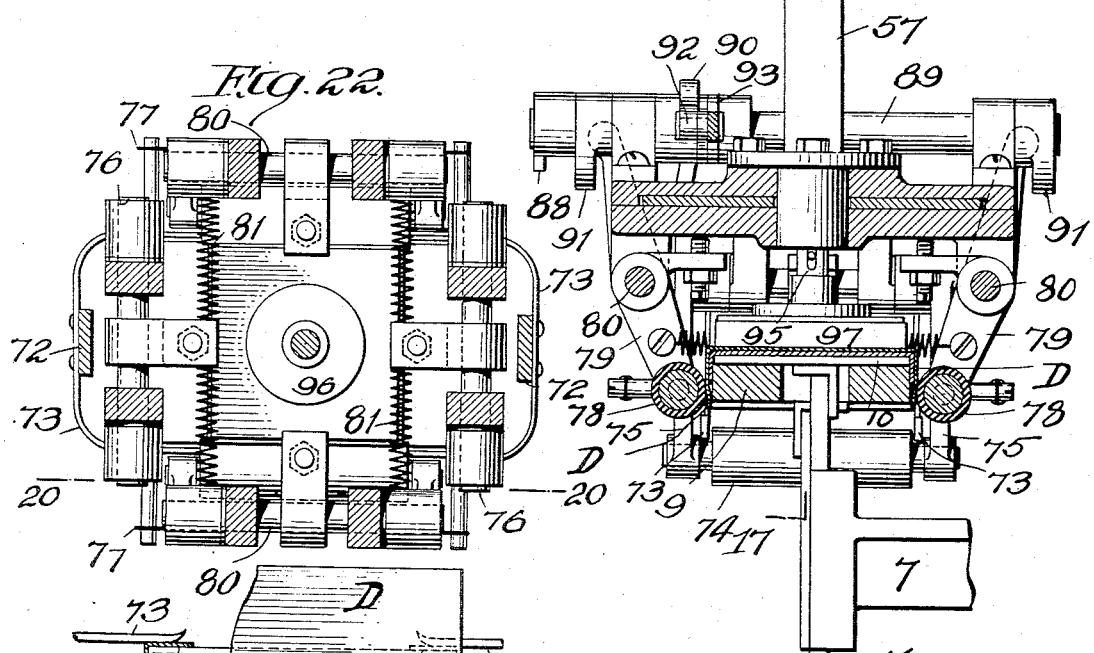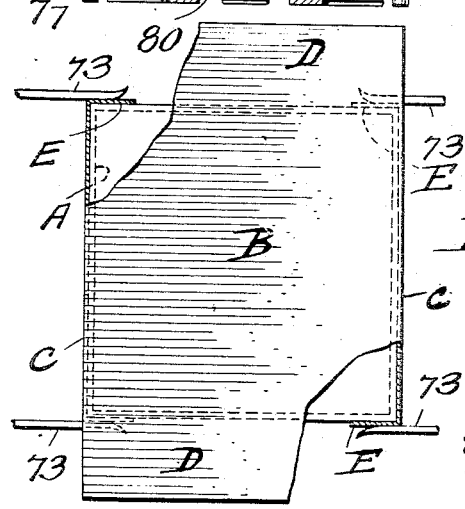

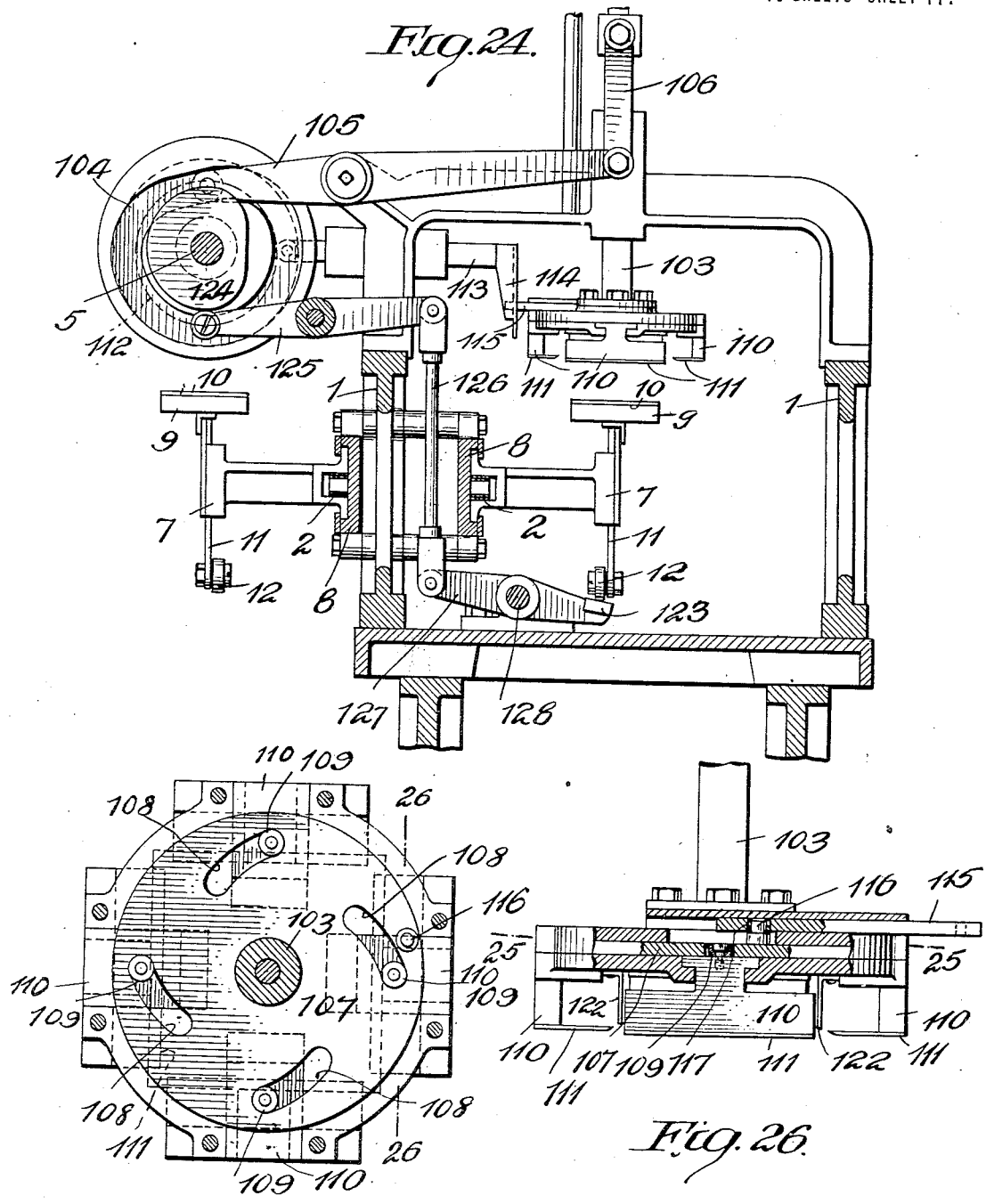

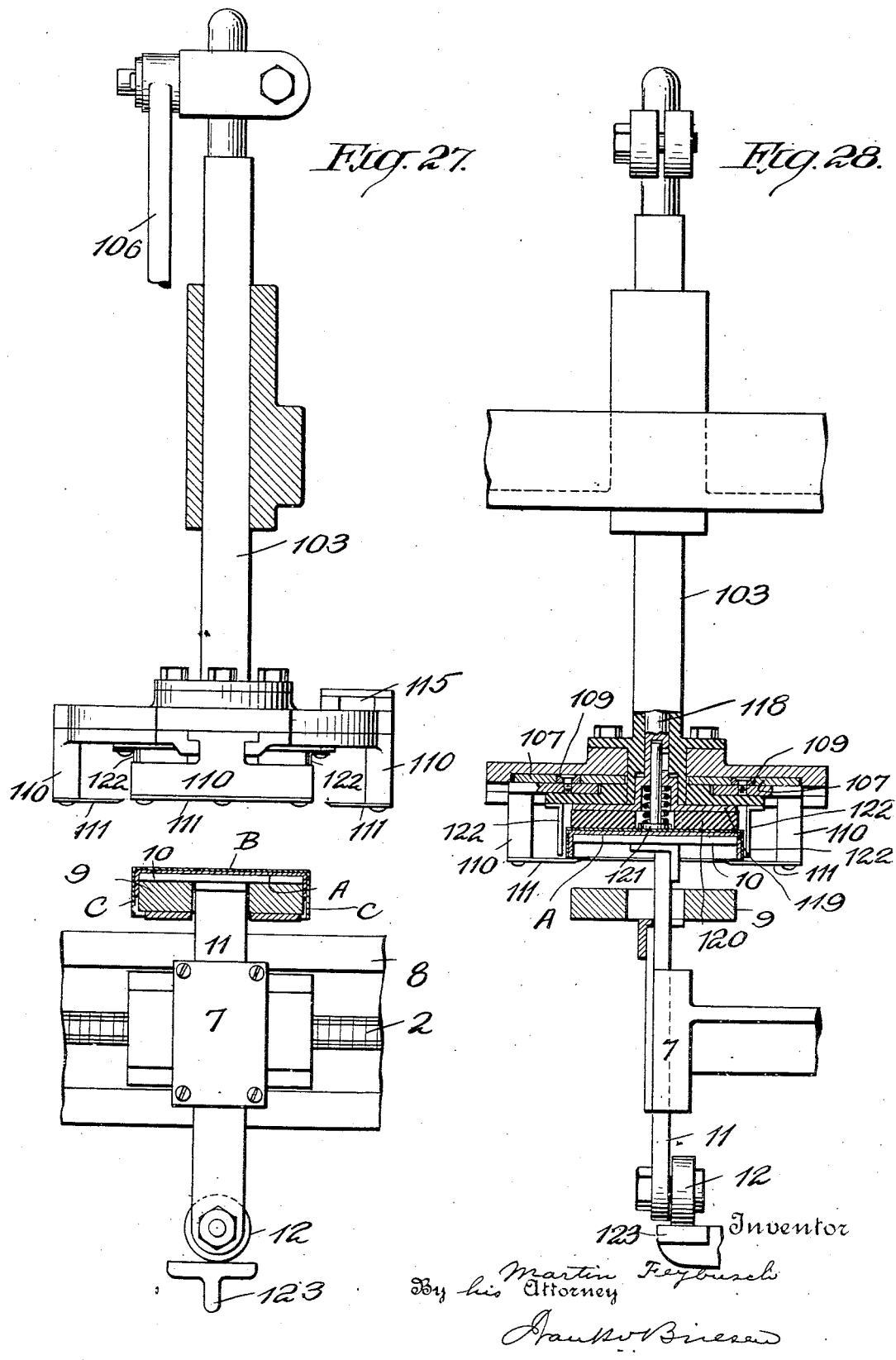

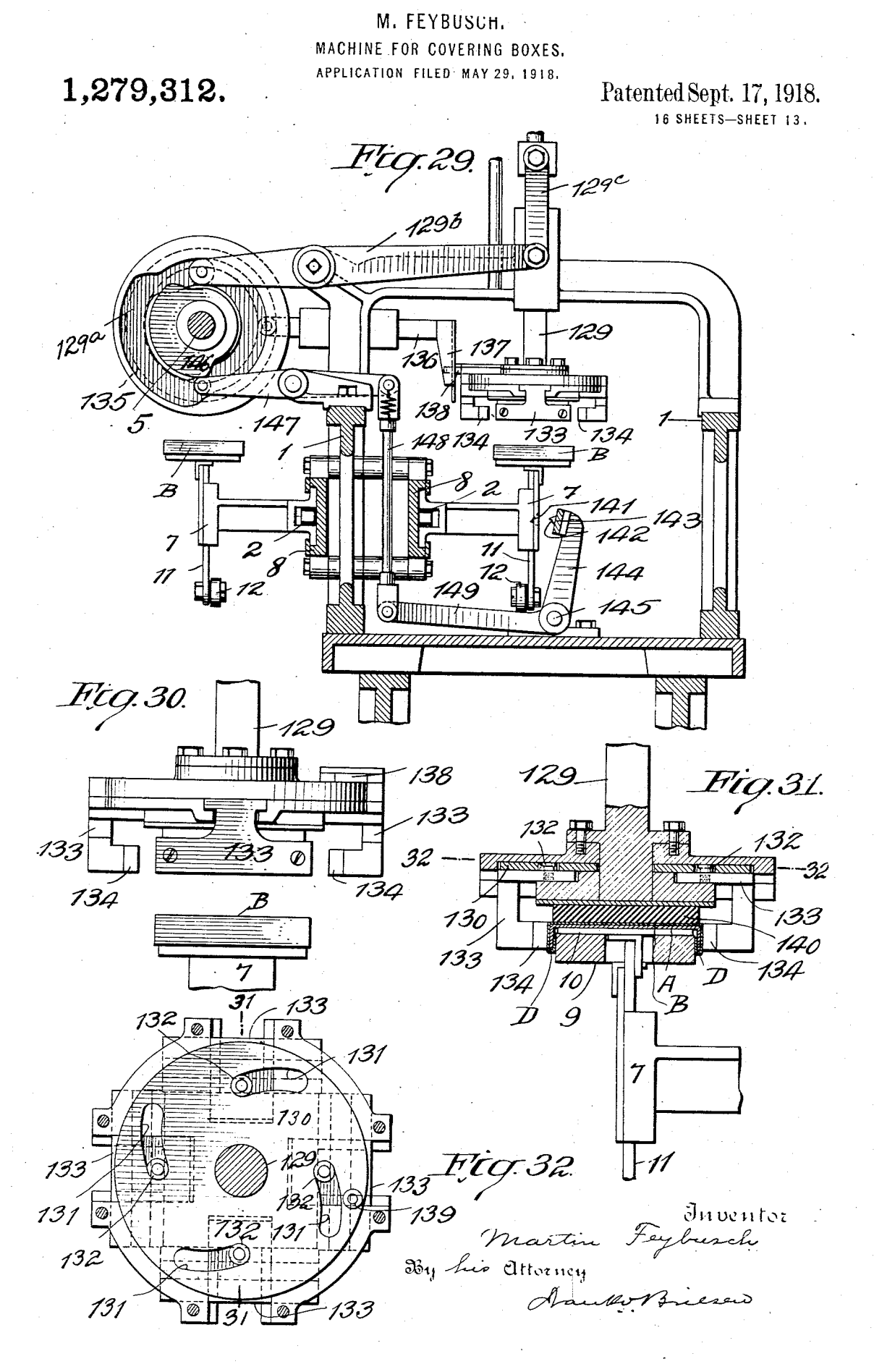

M. FEYBUSCH.
MACHINE FOR COVERING BOXES.
APPLICATION FILED MAY 29, 1918.

1,279,312.

Patented Sept. 17, 1918.
16 SHEETS—SHEET 13.

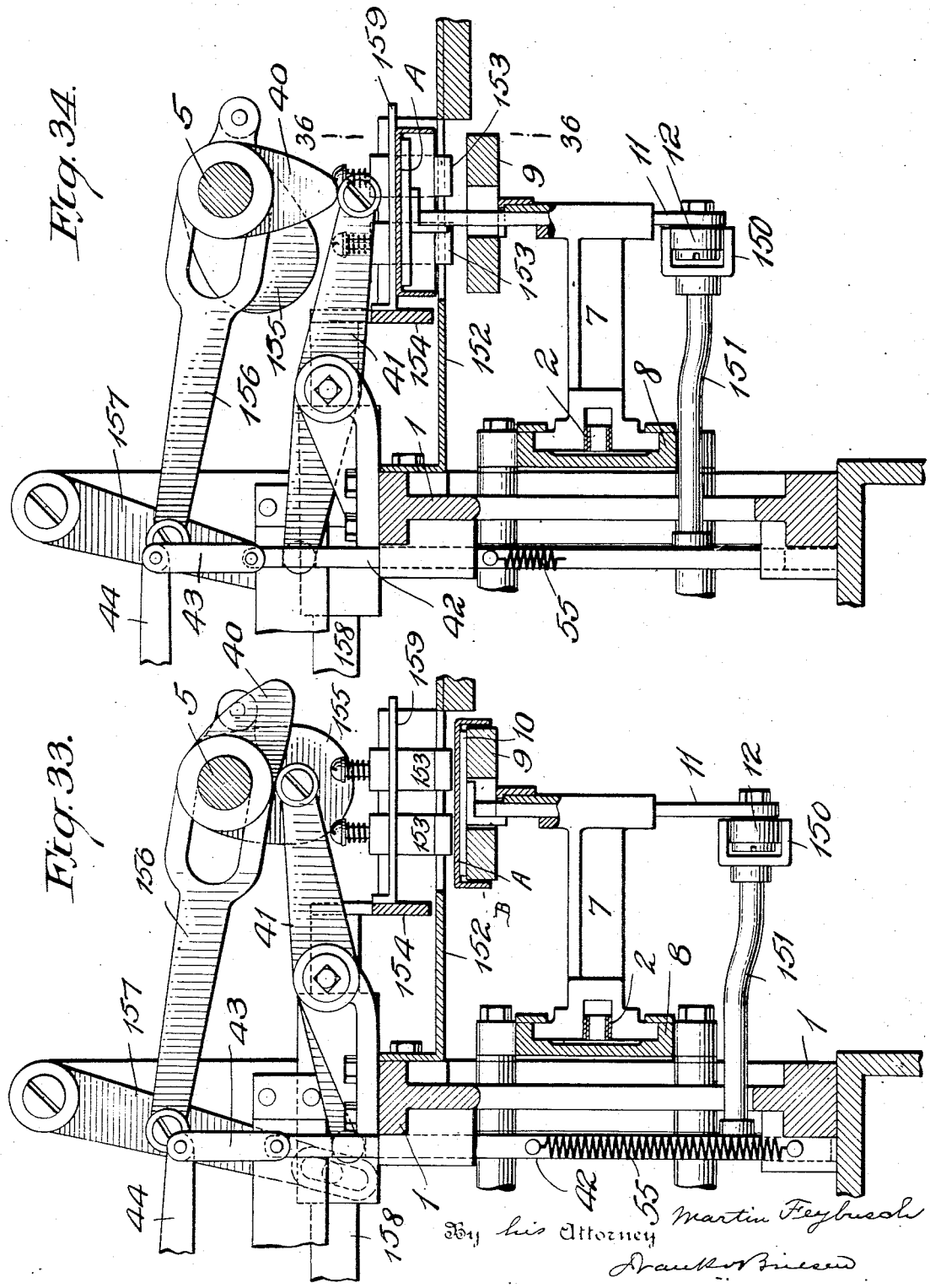

M. FEYBUSCH.
MACHINE FOR COVERING BOXES.
APPLICATION FILED MAY 29, 1918.
1,279,312.
Patented Sept. 17, 1918.
16 SHEETS—SHEET 15.
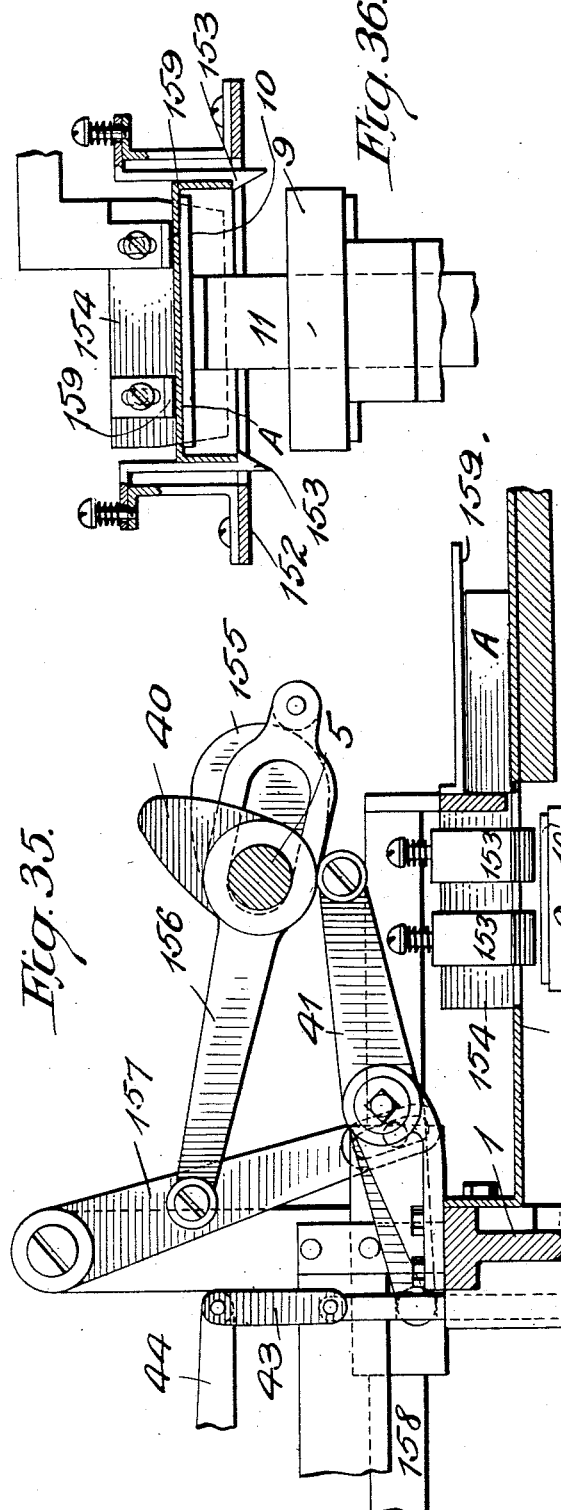
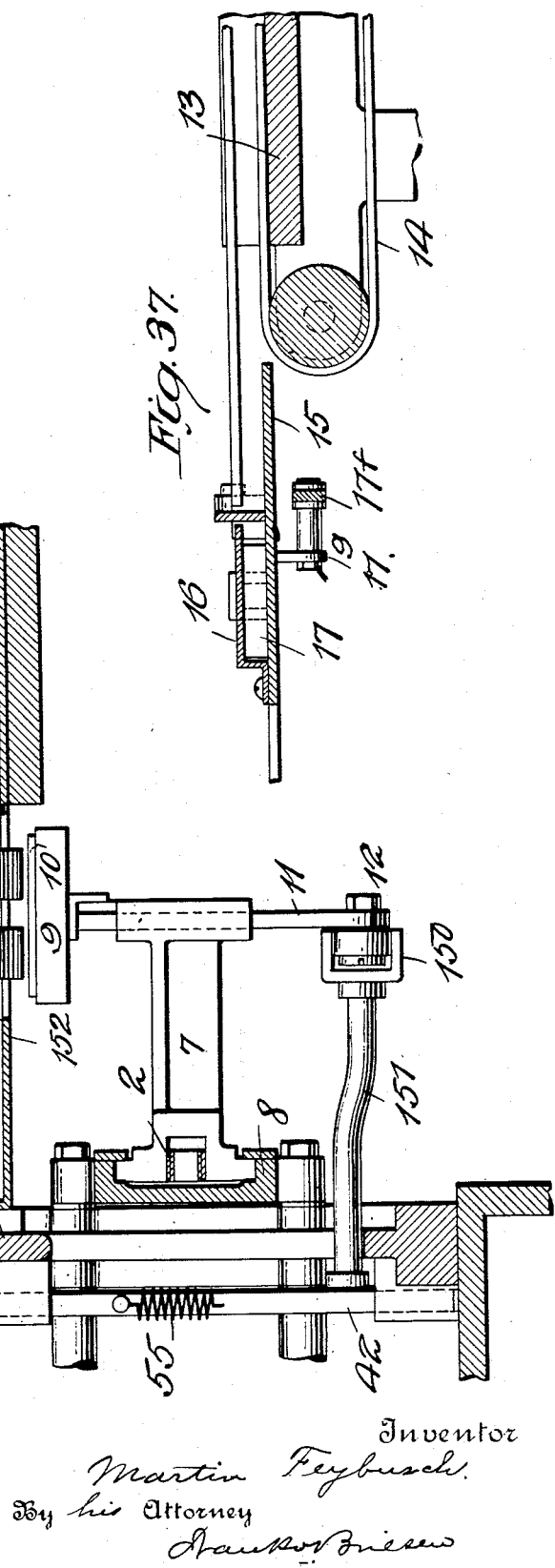
Inventor
Martin Feybusch.
By his Attorney M. FEYBUSCH.
MACHINE FOR COVERING BOXES.
APPLICATION FILED MAY 29, 1918.
1,279,312.
Patented Sept. 17, 1918.
16 SHEETS—SHEET 16.
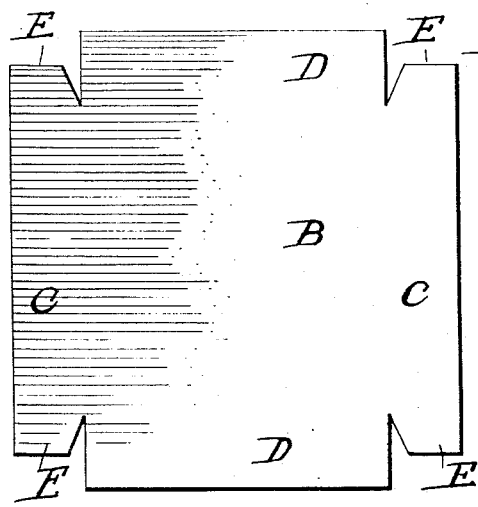
Fig. 38.
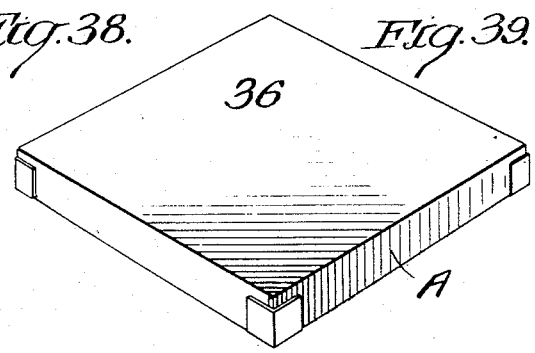
Fig. 39.
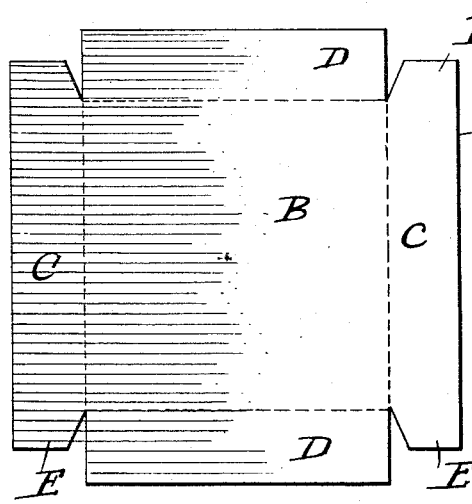
Fig. 40.
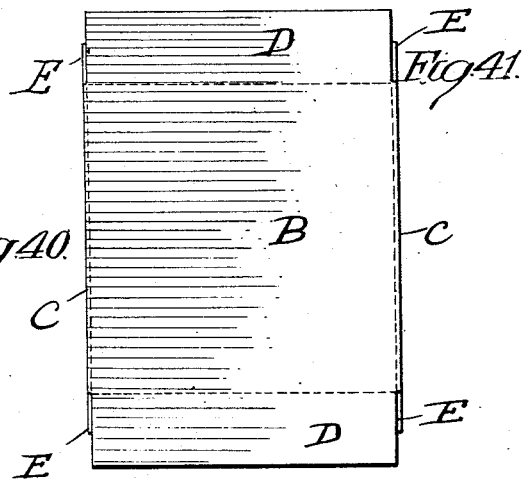
Fig. 41.
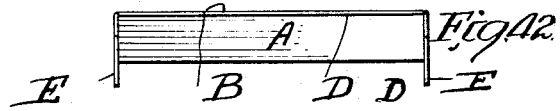
Fig. 42.
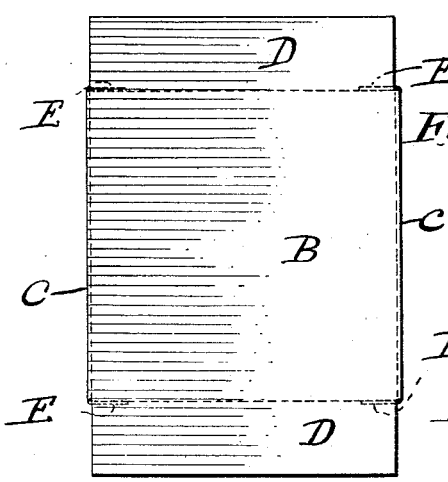
Fig. 43.
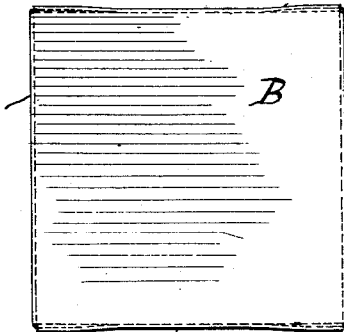
Fig. 45.
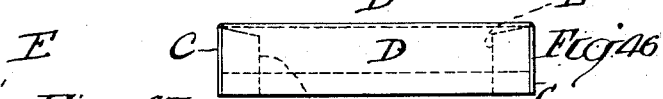
Fig. 46.
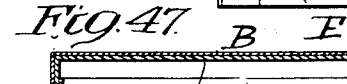
Fig. 47.
Fig. 44.
Inventor
Martin Feybusch
By his Attorney

UNITED STATES PATENT OFFICE.

MARTIN FEYBUSCH, OF SEA CLIFF, NEW YORK.

MACHINE FOR COVERING BOXES.

1,279,312.  Specification of Letters Patent.  Patented Sept. 17, 1918.

Application filed May 29, 1918.  Serial No. 237,232.

*To all whom it may concern:*

Be it known that I, MARTIN FEYBUSCH, a citizen of the German Empire, and a resident of Sea Cliff, in the county of Nassau and State of New York, have invented certain new and useful Improvements in Machines for Covering Boxes, of which the following is a specification.

This invention relates to a machine of novel construction by means of which the bottom and sides of square or oblong paper or other boxes are provided with a paper covering which is pasted thereto, and is lapped over the edges thereof. The machine is designed to be supplied with box bodies, and with cruciform covering blanks, the four wings of the latter being lapped over the sides of the box bodies. The invention consists in the various features of novelty more fully pointed out in the specification and appended claims.

Figure 1:
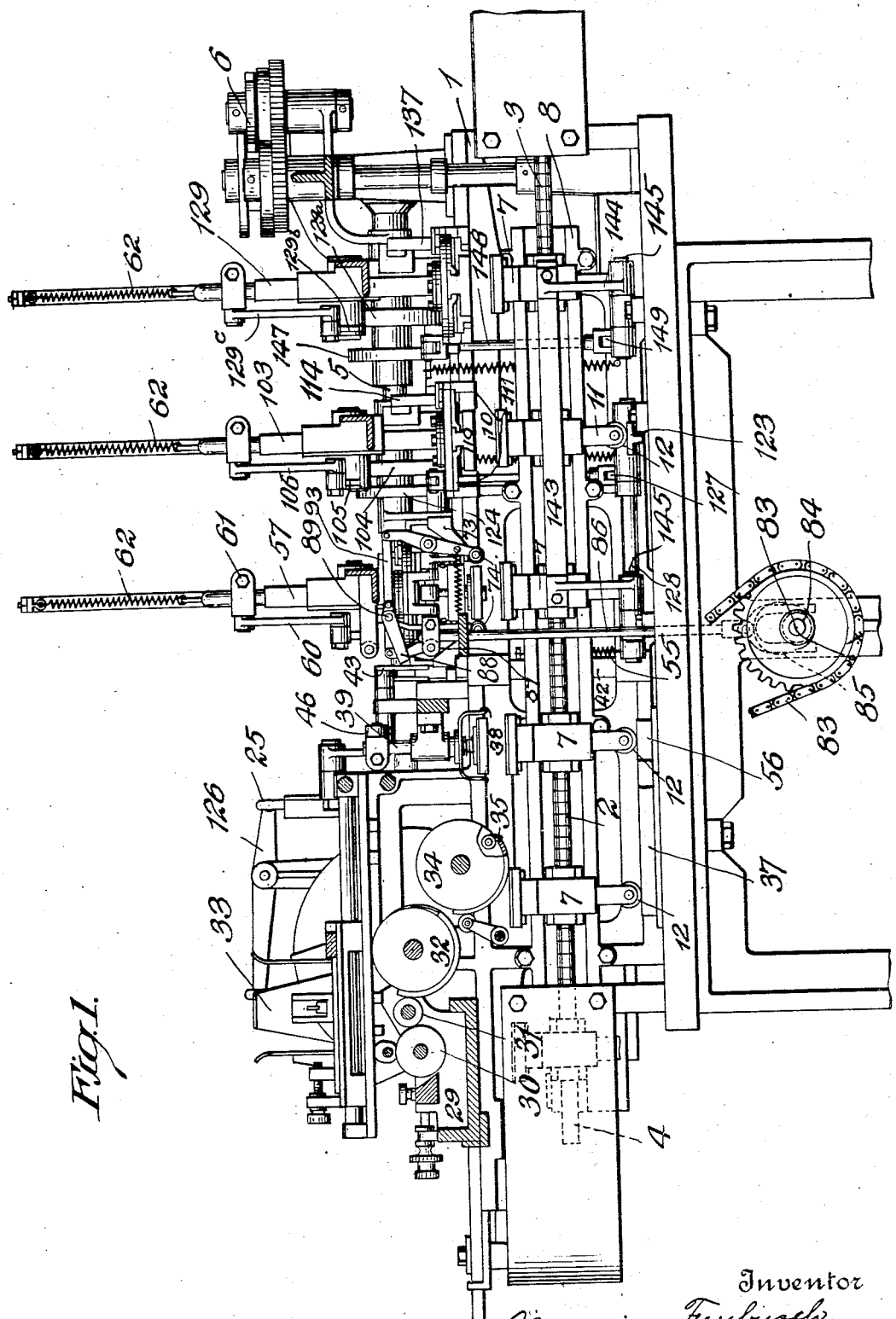
Figure 2:
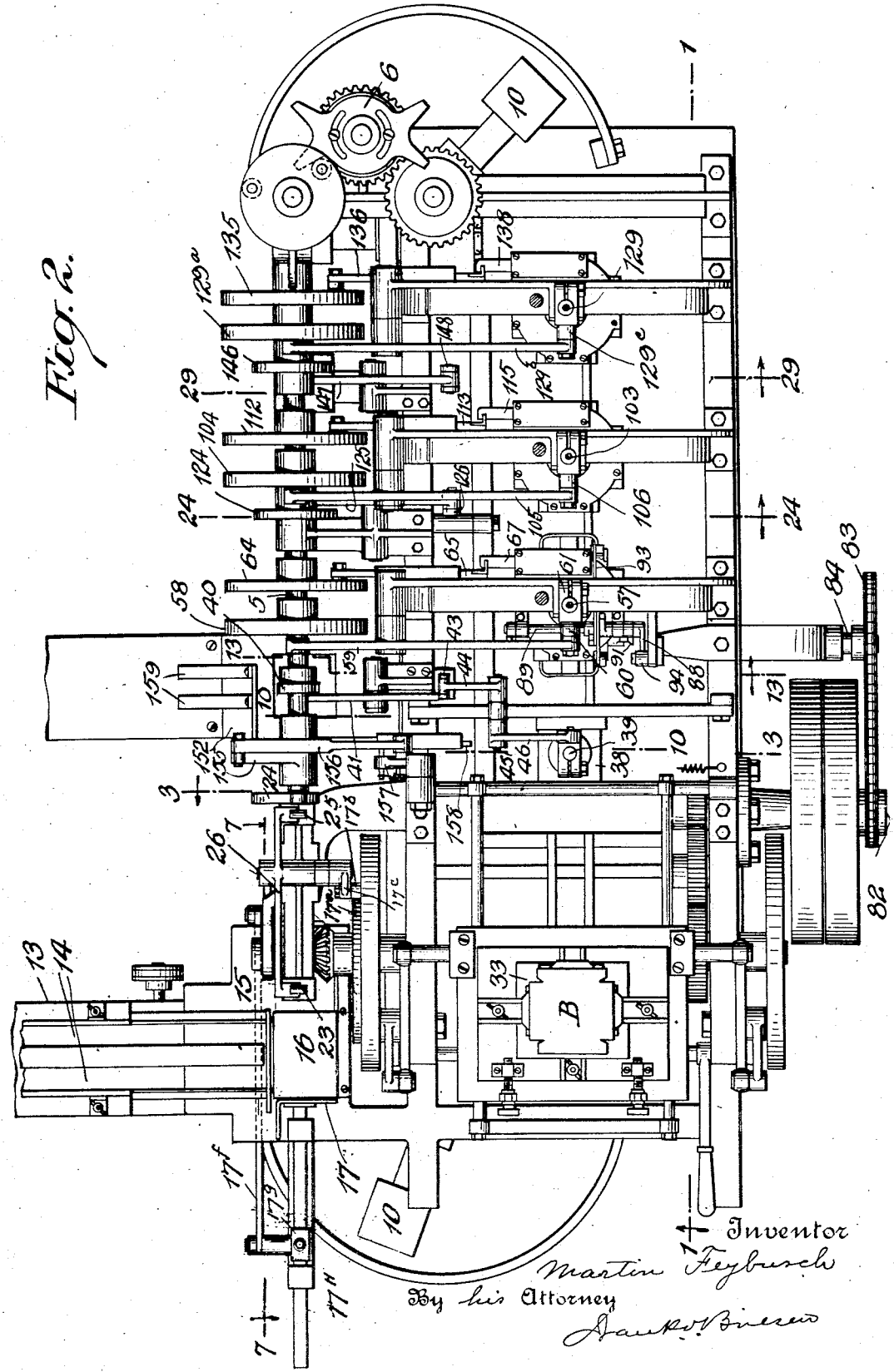
Figure 3:
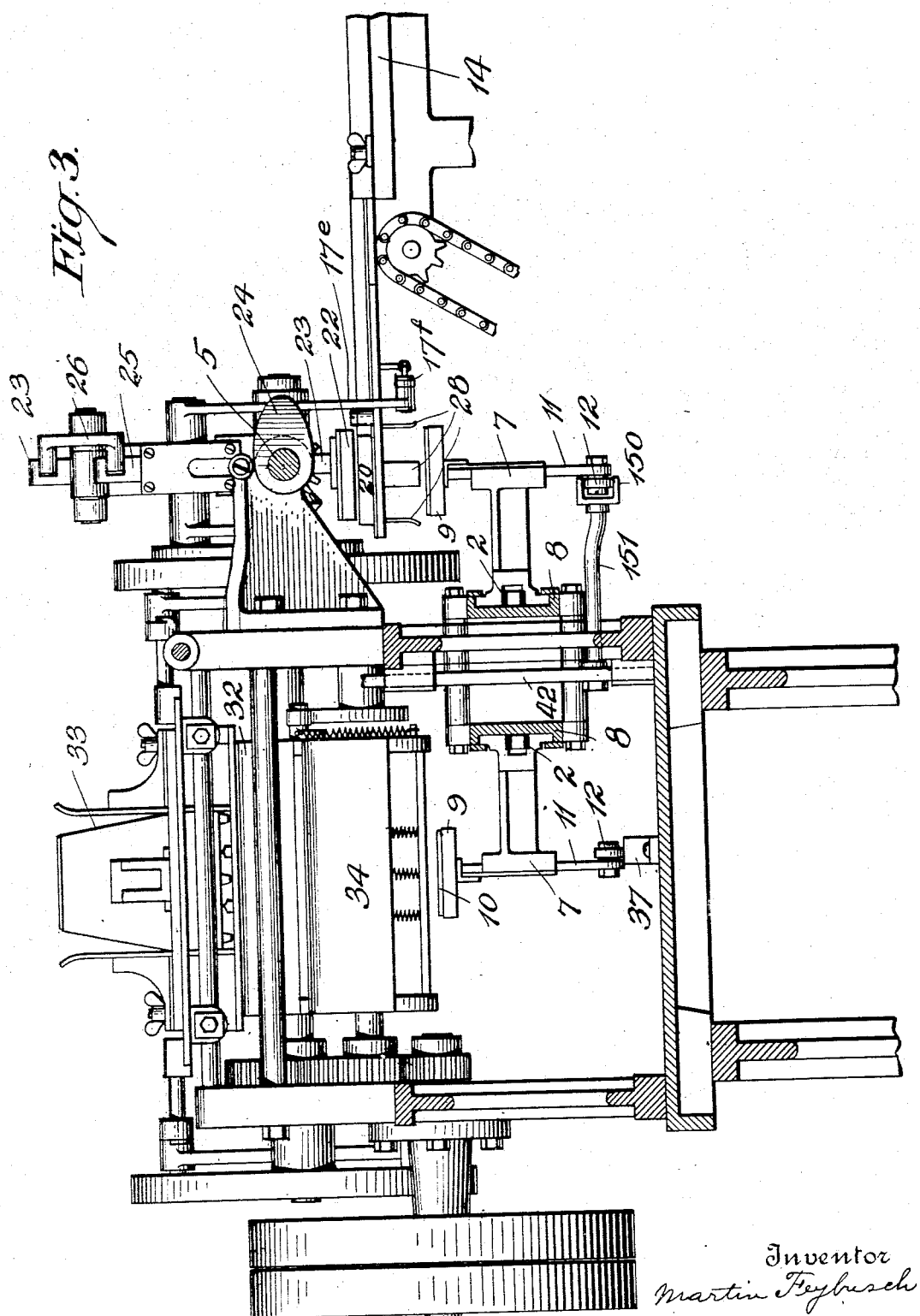

In the accompanying drawings:

Figure 1 is a vertical longitudinal section of a box covering machine, embodying my invention, on line 1—1 Fig. 2;

Fig. 2, a plan;

Fig. 3, a cross section on line 3—3 Fig. 2;

Fig. 4, a sectional rear elevation of part of the machine showing the box feeding and discharging devices;

Fig. 5, a sectional plan of Fig. 4;

Fig. 6, a section on line 6—6 Fig. 5;

Fig. 7, a section on line 7—7 Fig. 2;

Figs. 8 and 9 are similar sections showing the parts in consecutive positions;

Fig. 10, a section on line 10—10 Fig. 2;

Fig. 11, a section on line 11—11 Fig. 10;

Fig. 12, a longitudinal section of Fig. 11, showing the parts in a different position;

Fig. 13, a section on line 13—13 Fig. 2;

Fig. 14, a section on line 14—14 Fig. 13;

Fig. 15, a section on line 15—15 Fig. 14;

Fig. 16, a front elevation of the mechanism for turning in the end flaps and a pair of wings;

Fig. 17, a longitudinal section on line 17—17 Fig. 21;

Fig. 18, a section on line 18—18 Fig. 17;

Fig. 19, a section on line 19—19 Fig. 18;

Fig. 20, a section on line 20—20 Fig. 22;

Fig. 21, a longitudinal section at right angles to Fig. 17, and showing the parts in different position;

Fig. 22, a section on line 22—22 Fig. 20;

Fig. 23, a plan of the box showing the flaps folded;

Fig. 24, a section on line 24—24 Fig. 2;

Fig. 25, a section on line 25—25 Fig. 26;

Fig. 26, a section on line 26—26 Fig. 25;

Fig. 27, an elevation of the means for turning in the wings;

Fig. 28, a longitudinal section thereof taken at right angles to Fig. 27 and showing the parts in different position;

Fig. 29, a section on line 29—29 Fig. 2;

Fig. 30, an elevation of the pressing mechanism;

Fig. 31, a section on line 31—31 Fig. 32;

Fig. 32, a section on line 32—32 Fig. 31;

Fig. 33, a section through the box ejecting device;

Figs. 34 and 35 are similar sections showing the parts in consecutive positions;

Fig. 36, a section on line 36—36 Fig. 34;

Fig. 37, a section on line 37—37 Fig. 5;

Fig. 38, a view of the box covering blank;

Fig. 39, a perspective view of the box before being covered;

Fig. 40, a view of the box with superimposed cover;

Fig. 41, a similar view showing two of the wings folded;

Fig. 42, an end view of Fig. 41;

Fig. 43, a view showing the flaps turned in;

Fig. 44, an end view of Fig. 43;

Fig. 45, a view showing the two remaining wings turned in;

Fig. 46, an end view of Fig. 45, and

Fig. 47, a cross section of the finished product.

In the machine frame 1, is mounted, an endless drive chain 2, having a pair of parallel horizontal runs, and engaging at its turns, a pair of sprocket wheels 3 and 4 of which wheel 4 receives intermittent rotary movement from a driven shaft 5 by a Geneva movement 6 or in other manner. To chain 2 are affixed a plurality of outwardly projecting, equally spaced brackets 7 engaging at their inner ends, a pair of parallel guide rails 8 which extend along the inner sides of the chain runs, and serve to sustain the chain in the same horizontal plane during its movement. The outer end of each bracket 7, carries a table or platform 9 which constitutes a core and has a contour which corresponds to the inner horizontal section of the box to be covered, the drawing showing it to be of square shape. Upon the core 9, is adapted to rest, a correspondingly shaped plate or lifter 10, which is vertically movable, and is provided with a depending rod 11 that passes through an aperture of the core, and also through the bracket 7.

In the lower end of rod 11 is journaled a roller 12, by means of which the lifter may be raised in manner hereinafter explained. (Figs. 1, 2 and 3).

By the means described, the cores 9 are intermittently advanced, and will, during their travel, carry the box bodies along a line of stations, where the steps of covering said bodies are successively performed. Thus at station 1, the core receives a box body, turned upside down; at station 2, a covering blank previously supplied with an adhesive on one of its faces is superimposed upon the box and glued to the bottom thereof; at station 3, two opposed side wings of the covering are turned over the two corresponding sides of the box and are glued thereto; at station 4, short end flaps on the aforementioned wings are turned against and glued to the two uncovered sides of the box; and then the two remaining wings of the covering are turned over and glued to said last mentioned sides; at station 5, the protruding edges of the covering are first folded horizontally across the lower edges of the box, and are then turned in and are glued to the inner faces of the box sides; at station 6 the covered box is subjected to binding pressure on all of its sides, while, at station 7, the finished box is ejected.

*Station No. 1* (Figs. 4 and 5).

At the receiving or rear end of frame 1 the latter is provided with an extension or table 13, projecting at right angles thereto. Over this table, there extend longitudinally the upper runs of a pair of feed belts 14 engaging a pair of feed rolls (of which but one is shown) which are continuously driven in suitable manner. The feed belts carry the box bodies A to be covered (and which are placed upon the same, bottom upward) toward and upon a fixed platform 15, and underneath a guard 16. A pusher 17, operating at right angles to belts 14 and actuated by cam 17ª, roller 17ᵇ, shaft 17ᶜ, lever 17ᵈ, link 17ᵉ, clamp 17ᶠ, and rod 17ᵍ, moves the foremost box a short distance along the platform and over an aperture 18 of the latter, which is of sufficient size to permit the box to pass therethrough. When the box arrives above this aperture, it is temporarily sustained in position by means of a stop rail 19, a guide rail 20, and an opposed spring finger 21. The box is next pushed through said aperture and lowered upon plate 10 and core 9 so as to encompass the same by means of a plunger 22, the stem 23 of which receives reciprocating movement from shaft 2, by cam 24, rod 25, lever 26, and spring 27. As the box is projected by the plunger through platform 15, it is directed toward and over core 9, by a number of spring guides 28 depending from the platform.

*Station No. 2*, (Figs. 1, 3, 40.)

At its receiving end, frame 1 is provided with a glue pot 29 in which dips a glue receiving roller 30, which by means of a transfer roller 31, covers the surface of a rotary segment 32 with an adhesive film. Above this segment is located a hopper 33, in which the cruciform blanks B constituting the box coverings are stacked, the lowermost blank being supported upon segment 32, so that in this way, its lower face is covered with the adhesive. With segment 32 cooperates a second segment 34 having grippers 35 that serve to peel the gummed blank off segment 32 and transfer it to segment 34, similar to the operation described in Patent No. 1,173,378 issued to Emil Jagenberg on the 29th day of February 1916. Segment 34 in turn rolls over and thus transfers the blank to the bottom 36 of the box A (which has meanwhile arrived at station 2) and pastes thereto. While this operation is going on roller 19 engages a raised support 37 of frame 1, which relieves tension on bracket 7 during the transferring operation.

*Station No. 3*, (Figs. 10, 11, 12, 41, 42.)

At this station is provided a folder 38 which is of substantial inverted U-shape in cross section. This folder is mounted on a tubular shaft 39 receiving reciprocating movement from shaft 2, by cam 40, lever 41, rod 42, link 43, lever 44, shaft 45, lever 46 and clamp 47. Within tubular shaft 39 moves a tubular sleeve 48 carrying at its lower end a plunger head 49 furnished with a rubber pad 50, and influenced by a spring 51. Sleeve 48 in turn encompasses a spindle 52 carrying a presser foot 53 which is accommodated within an opening of pad 50 and is influenced by a spring 54.

In operation, shaft 39 descends carrying folder 38, plunger head 49 and presser foot 53 with it. When the pad 50 has thus been lowered upon the blank B (which is superimposed upon the bottom 36 of the box body A) springs 51 and 54 will be compressed, and the folder 38 will descend farther and turn a pair of opposed wings C of blank B against the corresponding sides of box A, so as to paste them thereto. When shaft 39 rises through action of spring 55, folder 38 is first withdrawn, the pad 50 still holding the box down. Next the pad rises, and finally the presser foot rises, the latter thus holding the box down during the withdrawal of the pad, so as to prevent the latter from taking the box along by suction. In this station, No. 3, roller 12, likewise engages a raised support 56 of the machine frame.

Station No. 4, (Figs. 13–23, 43–46).

During the preceding operation, the two side wings of the blank which were turned over the two sides of the box, were left projecting a short distance beyond the ends of the latter to form four protruding flaps E. By operation four, these flaps are first turned in against the uncovered box sides, and then the latter are covered by the two remaining wings of the blank. To effect these results, there is provided a plunger 57 intermittently operable from shaft 5 by closed cam 58, lever 59, link 60 and clamp 61, a spring 62 being preferably employed to assist the upward movement of the plunger. Within the head of plunger 57 is mounted a disk 63 which is adapted to be oscillated from shaft 5, by cam 64, rod 65, finger 66, slide 67 and a pin 68, which extends upwardly from the disk and enters a slot 69 of the slide. Disk 63 is provided with a pair of eccentric slots 70 engaged by rollers 71 carried by a pair of opposed slides 72, which by the oscillation of the disk, are simultaneously reciprocated toward or away from each other. Each slide is furnished with a pair of inwardly extending resilient fingers or folders 73 that are adapted to straddle the box. Upon the inward movement of the slides, the fingers will push the flaps E against the still uncovered sides of box A, and paste them thereto by the pressure exercised by said fingers. Immediately preceding this operation, the two covered sides of the box are engaged by a pair of pressure rolls 74 that upon the descent of the plunger, pass over the previously glued wings C and thus press them tightly against the sides of the box. Rolls 74 are hung below the lower operative ends of fingers 73 and are carried by arms 75 fulcrumed at 76 and drawn toward each other by a spring 77.

After the flaps E have been turned against the uncovered sides of the box, the wings D of the covering blank B that extend at right angles to wings C are folded and pasted against said sides. This operation is effected by means of a pair of pressure rolls 78 extending at right angles to rolls 74, and hung within a higher horizontal plane than the latter, and also in a higher plane than the inner operative ends of fingers 73. Rolls 78 are similar to rolls 74, carried by arms 79 fulcrumed at 80 and drawn toward each other by a spring 81. When plunger 57 descends, pressure rolls 74 first engage the covered sides of the box and roll down along the same as previously described. The plunger then stops and the fingers 73 which have been brought into position opposite flaps E are moved inwardly to turn said flaps against the uncovered sides of the box, and are then immediately withdrawn.

The plunger resumes its downward movement and thereby causes rolls 78 to fold wings D over flaps E, and over the previously uncovered sides of the box, and to paste them thereto. Prior to the ascent of plunger 57, rolls 74 as well as rolls 78 must be spread apart to clear the box. This spreading of the rolls is effected as follows: Power shaft 82 by chain drive 83 turns a countershaft 84, which by cam 85 raises and lowers a rod 86 provided at its upper end with a roller 87. This roller engages a tappet 88 on a rock shaft 89, carrying a pair of cams 90 and a second pair of cams 91. Of these, cams 90 are engaged by rollers 92 at the ends of slotted links 93 that encompass shaft 89, and are connected at their outer ends to the arms 75 of rolls 74 above fulcrums 76. Cams 91 engage arms 79 of rolls 78 above fulcrums 80. Thus upon the upward movement of rod 86, shaft 89 will be so turned, as to spread rolls 74 against action of spring 77, and rolls 78 against action of spring 81. The rolls having thus cleared the box, plunger 57 ascends, and during such ascent tappet 88 engages a fixed abutment 94, by means of which shaft 89 is so rocked, as to move rolls 74 and 78 back into their inner or normal position.

In order to hold the box to the core 9 while the covering operation is going on, the rod of plunger 57, is made tubular to receive a rod 95 carrying a head 96, having a pad 97. The latter is apertured for the reception of a spindle 98 carrying a presser foot 99 which is influenced by a spring 100. When the plunger 57 descends, pad 97 bears on box A through action of a spring 101. When the plunger rises, the pad is withdrawn prior to the withdrawal of presser foot 99, for the reason stated when discussing presser foot 53. It should be stated that in this station, roller 12, engages a raised support 102.

Station No. 5, (Figs. 24–28.)

A plunger 103 is intermittently reciprocated from shaft 5 by cam 104, lever 105, and link 106. Within the plunger head is fitted an oscillatable disk 107 having eccentric slots 108, engaged by rollers 109 of two pair of opposed blade holders or slides 110. Each of these holders carries at its lower end, an inwardly projecting horizontal blade or folder 111, adapted to turn the protruding end of each wing horizontally across the lower edge of the respective box side. Disk 107 is operated from shaft 5 by cam 112, link 113, finger 114, slide 115 and pin 116 that engages a slot 117 of the slide. From the center of the plunger head, there depends a sleeve 118 carrying a plunger 119 provided with a pad 120 and furnished with a spring-influenced presser foot 121, in manner described with reference to stations 3 and 4. Plunger 119 is surrounded by four guide plates 122 arranged at right angles to each other and depending from plunger 103. Below the latter, plate 10 is adapted to be raised off core 9 by means of a finger 123 which underlies roller 12, and is operated from shaft 5 by cam 124, lever 125, rod 126 and link 127 turning on shaft 128.

When the box arrives at station 5, plunger 103 descends until pad 120 rests against the upper side of the box. Plate 10 then rises to lift the box off the core 9, the box in turn raising pad 120. Blades 111 now move inward to turn the protruding edges of wings C and D horizontally across the edge of the box body, two of the blades being set slightly above the other two to prevent interfering. The blades are withdrawn and plunger head 103 descends, together with pad 120. At the same time, plate 10 is lowered upon core 9 by the descent of finger 123, so that in this way, the box is again projected over core 9. As the box is thus being moved over the core, the latter will turn the protruding edges of the wings C and D upward and against the inner faces of the box sides, to which they will become glued. After this action has been completed, plunger 103 as well as pad 120 rises, while plate 10 remains depressed ready for the next operation.

Station No. 6, (Figs. 29-32.)

A plunger 129 operated by cam 129$^a$, arm 129$^b$, and link 129$^c$, carries an oscillatable disk 130, having eccentric slots 131 which are engaged by rollers 132 of two pair of opposed slides 133. Each slide carries at its lower end, a presser jaw 134, adapted to engage one of the sides of the box throughout the entire length and height thereof, and provided with a padded inner working face. Disk 130 is oscillated from shaft 5 by cam 135, lever 136, finger 137, slide 138, and pin 139. To the lower side of plunger 129 is affixed a pad 140. Plunger 129 descends until pad 140 rests on the box and then the four slides 133 are moved inwardly, so that the padded faces of jaws 134 will bear firmly against all the four sides of the box, and press them against core 9. In this way, the bottom of the box, as well as its four sides are simultaneously subjected to pressure, in order to smoothen out all parts of the covering and insure a neat finish.

For the purpose of locking brackets 7, at their different stations and to relieve them of undue pressure, they are provided with mortises 141 into which pins 142 are adapted to be projected. These pins extend inwardly from a longitudinally disposed horizontal bar 143, which is connected at its ends to a pair of oscillable arms 144, turning on centers 145. One of these arms is adapted to be rocked from shaft 5 by cam 146, lever 147, rod 148, and arm 149. The timing is such that pins 142 enter mortises 141 when the brackets 7 are at rest, and prior to the movement of the several plungers, while they are withdrawn directly before the brackets resume their motion.

Station No. 7, (Figs. 33-36.)

The finished box is by plate 10, raised off core 9 for which purpose, roller 12 enters a claw 150 formed on the outer end of a horizontal rod 151, which is adapted to be raised and lowered from shaft 5 by cam 40, lever 41 and rod 42. As plate 10 is raised, the box will be carried by it upwardly and above the surface of a delivery plate 152 through an opening thereof, in which position, it is held by a plurality of spring hooks 153 which pass beneath the lower edge of the box. The box is then engaged by a pusher 154 which slides the same off hooks 153 and upon plate 152. This pusher is operated from shaft 5 by cam 155, arm 156, lever 157, and slide 158. The pusher is provided with a pair of overhead horizontally disposed spring arms 159, which check the upward movement of the box, while the same is being raised, and furthermore constitute guides while the box is being slid by the pusher from the hooks upon the delivery plate.

It is of course, obvious that a number of boxes will be simultaneously put through the machine, and that the latter is adapted to operate on box covers as well as box bodies, the word "box" in the claims, being intended to embrace both devices.

The machine is adapted to cover boxes made of paper as well as those made of sheet metal, wood, fiber or other material. It is also adapted to inwrap boxes or containers that have been previously charged and closed by a cover, thus producing a sanitary dust proof package.

I claim:

1. A box covering machine, comprising an endless drive chain, means for imparting intermittent movement thereto, a plurality of cores carried by the chain and adapted to support boxes and superimposed cruciform adhesive covers, and a plurality of members arranged along the path of said cores and adapted to fold said covers over the sides of said boxes.

2. A box covering machine, comprising an endless drive chain, means for imparting intermittent movement thereto, a plurality of cores carried by the chain and adapted to support boxes and superimposed cruciform adhesive covers, and a plurality of members arranged along the path of said cores and adapted to fold said covers over the sides of the boxes, and against the inner faces thereof.

3. A box covering machine, comprising an endless drive chain, means for imparting intermittent movement thereto, a plurality of cores carried by the chain and adapted to support boxes and superimposed adhesive crucifrom covers, means arranged along the path of said cores for turning a cover over two opposed sides of a box, further means arranged along said path for turning the resulting end flaps against the two other box sides and for then turning the cover over said last named sides, and further means arranged along said path for turning the edges of the cover against the inner face of the box.

4. A box covering machine, comprising an endless intermittently driven chain, a plurality of spaced cores carried thereby, first means arranged along the path of said cores for projecting a box over a core, second means arranged along said path for superimposing an adhesive cruciform cover on the box, third means arranged along said path for turning opposed wings of the cover over two sides of the box, fourth means arranged along said path for turning the resulting end flaps against the two other box sides and for turning the two other cover wings against said last named sides, fifth means arranged along said path for folding the edges of the cover against the inner face of the box, sixth means arranged along said path for subjecting the cover to a binding pressure, and seventh means arranged along said path for ejecting the box.

5. In a box covering machine, an endless drive chain, a plurality of brackets affixed thereto, cores mounted on the brackets and adapted to support boxes, and means arranged along the path of said chain for covering said boxes.

6. In a box covering machine, an endless drive chain, a plurality of brackets affixed thereto, cores mounted on the brackets, lifter plates supported on the cores, and means for raising said plates off said cores.

7. In a box covering machine, an endless drive chain having a pair of parallel horizontal runs, a pair of guide rails extending along said runs, a plurality of brackets carried by the chain and engaging said guide rails with their inner ends, and cores mounted on the outer ends of the brackets.

8. In a box covering machine, a receiving platform having an aperture, means for pushing a box over said aperture, means for sustaining said box above said aperture, a core movable below the aperture, and a plunger for projecting the box through the aperture upon the core.

9. In a box covering machine, a frame having a lateral extension, a feed belt on said extension, a receiving platform located in advance of the extension and having an aperture, a pusher slidable on the platform at right angles to the feed belt, a guard above the platform, a spring finger and cooperating rail at the aperture and adapted to engage a box, and a vertically movable plunger adapted to project said box through said aperture.

10. In a box covering machine, a core, means for intermittently advancing said core, means for projecting a box over the core, means for gumming a cover, and means for superimposing said cover on said box.

11. In a box covering machine, a core adapted to support a box and a superimposed adhesive cover, means for advancing said core, a vertically reciprocal member arranged in the path of said core, and an inverted U-shaped folder carried by said member and adapted to be projected over the core.

12. In a box covering machine, a core adapted to support a box and a superimposed adhesive cover, means for advancing said core, a vertically reciprocal tubular member arranged in the path of the core, a folder carried by said member, and a pad operably connected to said member.

13. In a box covering machine, a core adapted to support a box and a superimposed adhesive cover, a vertically reciprocal tubular member, a folder carried by said member, a tubular sleeve encompassed by said member, a pad carried by said sleeve, said pad having an opening, a spindle encompassed by the sleeve, and a presser foot carried by said spindle and received within said opening.

14. In a box covering machine, a core adapted to support a box and a superimposed adhesive cover, a plunger, a pair of opposed slides carried thereby, means for moving said slides toward or away from each other, and inwardly extending resilient fingers carried by said slides and adapted to straddle the box.

15. In a box covering machine, a core adapted to support a box and a superimposed adhesive cover, a plunger, a disk carried thereby and having a plurality of eccentric slots, means for oscillating the disk, a pair of opposed slides, members on said slides that engage said slots, and inwardly extending resilient fingers carried by the slides and adapted to straddle the box.

16. In a box covering machine, a core adapted to support a box and a superimposed adhesive cover, a plunger, a pair of opposed slides carried thereby, means for moving said slides toward or away from each other, fingers extending inwardly from the slides, and a pair of pressure rolls mounted on the plunger below said fingers.

17. In a box covering machine, a core adapted to support a box and a superimposed adhesive cover, a plunger, a pair of opposed slides carried thereby, means for moving said slides toward or away from each other, fingers extending inwardly from the slides, a first pair of pressure rolls mounted on the plunger below said fingers, and a second pair of pressure rolls extending at right angles to said first named pair of rolls and mounted at a higher elevation than said first named rolls.

18. In a box covering machine, a core adapted to support a box and a superimposed adhesive cover, a plunger, a pair of oppositely movable slides mounted thereon, fingers carried by the slides, two pair of opposed pressure rolls movably connected to the plunger, and means for spreading said rolls.

19. In a box covering machine, a core adapted to support a box and a superimposed adhesive cover, a plunger, a pair of oppositely movable slides mounted thereon, fingers carried by said slides, arms fulcrumed to the plunger, two pair of opposed pressure rolls hung in said arms, a rock shaft, and cams on said rock shaft that are operatively connected to said arms.

20. In a box covering machine, a plunger, a first pair of rolls carried thereby, a spring connecting said rolls, a second pair of rolls likewise carried by the plunger and arranged at a different elevation from the first named pair, a spring connecting the rolls of said second pair, means for simultaneously spreading the rolls, and means for simultaneously retracting the rolls.

21. In a box covering machine, a plunger, a pair of opposed slides mounted thereon, fingers depending from the slides, pressure rolls carried by the plunger, a rod encompassed by the plunger, an apertured pad on said rod, and a presser foot within the pad.

22. In a box covering machine, a plunger, two pair of opposed slides carried thereby, horizontally disposed blades projecting inwardly from said slides, and a movable core adapted to carry a box and a superimposed adhesive cover to a position underneath the plunger.

23. In a box covering machine, a plunger, two pair of opposed slides carried thereby, horizontally disposed blades projecting inwardly from said slides, a movable core adapted to carry a box and a superimposed adhesive cover beneath the plunger, a lifter plate adapted to be supported upon the core, and means for raising said plate off said core.

24. In a box covering machine, a plunger, a disk carried thereby and having a plurality of eccentric slots, means for oscillating the disk, two pair of opposed slides, members on said slides that engage said slots, and horizontally disposed blades projecting inwardly from the slides.

25. In a box covering machine, a plunger, two pair of opposed slides carried thereby, horizontally disposed blades projecting inwardly from said slides, a sleeve engaging the plunger, a pad carried by said sleeve, and a presser foot coöperating with said pad.

26. In a box covering machine, a plunger, two pair of opposed slides carried thereby, presser jaws carried by the slides, and a movable core adapted to carry a box and a superimposed adhesive cover to a position underneath the plunger.

27. In a box covering machine, a plunger, a pad affixed to the lower side thereof, two pair of opposed slides carried by the plunger, and presser jaws carried by the slides.

28. In a box covering machine, a plunger, a pad affixed to the lower side thereof, a disk carried by the plunger and having a plurality of eccentric slots, means for oscillating said disk, two pair of opposed slides, members on said slides that engage said slots, and presser jaws carried by the slides.

29. In a box covering machine, an endless drive chain, a plurality of brackets affixed thereto, cores carried by said brackets, and means for locking said brackets.

30. In a box covering machine, an endless drive chain, a plurality of brackets affixed thereto, said brackets having mortises, cores carried by said brackets, a horizontal bar, pins on said bar that are adapted to engage said mortises, and oscillatable arms carrying the bar.

31. In a box covering machine, a frame, an apertured delivery plate carried thereby, a core adapted to be moved beneath said plate, a lifter plate adapted to be supported on said core, means for raising said lifter plate beneath said delivery plate, and a plurality of hooks carried by the delivery plate.

32. In a box covering machine, a frame, an apertured delivery plate carried thereby, a core adapted to be moved beneath said plate, a lifter plate adapted to be supported on said core, means for raising said lifter plate beneath said delivery plate, a plurality of hooks carried by the delivery plate, a pusher slidable over the delivery plate, and overhead spring arms carried by the pusher.

MARTIN FEYBUSCH.